(12) United States Patent
Hartung et al.

(10) Patent No.: US 10,526,896 B2
(45) Date of Patent: Jan. 7, 2020

(54) TURBOMACHINE BLADE ASSEMBLY

(71) Applicant: MTU Aero Engines AG, Munich (DE)

(72) Inventors: Andreas Hartung, Munich (DE);
Manfred Schill, Munich (DE)

(73) Assignee: MTU Aero Engines AG, Munich (DE)

( * ) Notice: Subject to any disclaimer, the term of this patent is extended or adjusted under 35 U.S.C. 154(b) by 369 days.

(21) Appl. No.: 15/488,544

(22) Filed: Apr. 17, 2017

(65) Prior Publication Data

US 2017/0314397 A1 Nov. 2, 2017

(30) Foreign Application Priority Data

Apr. 27, 2016 (EP) .................................. 16167366

(51) Int. Cl.
| | |
|---|---|
| *F01D 5/16* | (2006.01) |
| *F01D 9/02* | (2006.01) |
| *F04D 29/32* | (2006.01) |
| *F04D 29/54* | (2006.01) |
| *F04D 29/66* | (2006.01) |

(52) U.S. Cl.
CPC ................ *F01D 5/16* (2013.01); *F01D 9/02* (2013.01); *F04D 29/324* (2013.01); *F04D 29/542* (2013.01); *F04D 29/668* (2013.01); *F05D 2220/323* (2013.01); *F05D 2250/232* (2013.01)

(58) Field of Classification Search
CPC ......... F01D 5/16; F04D 29/542; F04D 29/322
See application file for complete search history.

(56) References Cited

U.S. PATENT DOCUMENTS

| | | | | | |
|---|---|---|---|---|---|
| 1,833,751 | A | * | 11/1931 | Kimball | .................... F01D 5/16 188/322.5 |
| 1,833,754 | A | * | 11/1931 | Paget | ........................ F01D 5/16 416/215 |
| 2,349,187 | A | * | 5/1944 | Meyer | ....................... F01D 5/16 188/322.5 |
| 2,651,494 | A | * | 9/1953 | Persson | ................. F01D 5/3053 29/889.21 |
| 3,752,599 | A | * | 8/1973 | Pace | ......................... F01D 5/22 416/190 |
| 3,759,633 | A | * | 9/1973 | Tournere | ................. F01D 5/326 416/220 R |

(Continued)

FOREIGN PATENT DOCUMENTS

| | | |
|---|---|---|
| EP | 2484870 A1 | 8/2012 |
| EP | 2570600 A2 | 3/2013 |

(Continued)

*Primary Examiner* — Woody A Lee, Jr.
(74) *Attorney, Agent, or Firm* — Barlow, Josephs & Holmes, Ltd.

(57) ABSTRACT

The present invention relates to a turbomachine blade or vane arrangement having a first turbomachine blade or vane, a second turbomachine blade or vane adjacent to it, and at least one tuning element guide housing with at least one cavity, in which at least one tuning element is arranged with play of movement for impact contact with the tuning element guide housing, with the tuning element guide housing being arranged at least in part in a recess, in particular in a frame, of the first turbomachine blade or vane, where the second turbomachine blade or vane has at least one first rib for securing the tuning element guide housing arranged in the recess.

16 Claims, 3 Drawing Sheets

(56) References Cited

U.S. PATENT DOCUMENTS

| | | | | |
|---|---|---|---|---|
| 3,887,298 | A * | 6/1975 | Hess | F01D 5/22 |
| | | | | 416/220 R |
| 4,182,598 | A * | 1/1980 | Nelson | F01D 5/22 |
| | | | | 416/193 A |
| 4,236,607 | A * | 12/1980 | Halwes | B64C 27/001 |
| | | | | 188/379 |
| 4,460,314 | A * | 7/1984 | Fuller | F01D 5/26 |
| | | | | 416/145 |
| 5,205,713 | A * | 4/1993 | Szpunar | F01D 5/26 |
| | | | | 416/193 A |
| 5,573,375 | A * | 11/1996 | Barcza | F01D 5/22 |
| | | | | 416/193 A |
| 6,171,058 | B1 * | 1/2001 | Stec | F01D 5/22 |
| | | | | 416/193 A |
| 7,686,571 | B1 * | 3/2010 | Matheny | F01D 9/041 |
| | | | | 415/200 |
| 9,371,733 | B2 * | 6/2016 | Hartung | F01D 5/16 |
| 9,982,559 | B2 * | 5/2018 | Hartung | F01D 5/10 |
| 10,316,670 | B2 * | 6/2019 | Morris | F01D 5/16 |

FOREIGN PATENT DOCUMENTS

| | | |
|---|---|---|
| EP | 3020922 A1 | 5/2016 |
| WO | 2012095067 A1 | 7/2012 |

* cited by examiner

TURBOMACHINE BLADE ASSEMBLY

The studies that have led to this invention were supported according to the Financial Aid Agreement No. CSJU-GAM-SAGE-2008-001 under the European Union's Seventh Framework Program (FP7/2007-2013) for the Clean Sky Joint Technology Initiative.

BACKGROUND OF THE INVENTION

The present invention relates to a turbomachine blade or vane arrangement having a first turbomachine blade or vane and a second turbomachine blade or vane adjacent to it, to a turbomachine stage, in particular a compressor or turbine stage, with the turbomachine blade or vane arrangement, and to a turbomachine, in particular a gas turbine, with the turbomachine stage.

Commonly owned European patent application with the filing number 15190023.0 relates to a turbomachine blade or vane arrangement having a turbomachine blade or vane and a tuning element guide housing with cavities, in which tuning elements, which are provided for impact contact with the tuning element guide housing, are accommodated, the tuning element guide housing being arranged in a recess of the turbomachine blade or vane and is fastened in place by a locking plate.

SUMMARY OF THE INVENTION

An object of one embodiment of the present invention is to improve a turbomachine.

This object is achieved by a turbomachine blade or vane arrangement of the present invention. The present invention provide a turbomachine stage having one or a plurality of the turbomachine blade or vane arrangements described herein and for a turbomachine having one or a plurality of the turbomachine stages described herein, respectively. Advantageous embodiments of the invention are discussed in detail below.

In accordance with one embodiment of the present invention, a turbomachine blade or vane arrangement has a first turbomachine blade or vane and a second turbomachine blade or vane that is adjacent to it, in particular in the peripheral direction and/or in mounted position.

Directional indications, in particular "axial" or "axial direction," "radial" or "radial direction," and "peripheral direction," refer herein particularly to a mounted position of the turbomachine blade or vane arrangement or turbomachine stage and/or to a (main or rotational) axis of the turbomachine (stage). Accordingly, in one embodiment, an axial direction is parallel to the (main or rotational) axis of the turbomachine (stage), a radial direction is perpendicular thereto, and a peripheral direction is a direction of revolution or rotation around the (main or rotational) axis or axial direction.

In one embodiment, the turbomachine blades or vanes are, in particular, rotating blades or also guide vanes for a, particularly one, turbomachine stage, in particular a compressor or turbine stage, for a turbomachine, particularly one turbomachine, in particular a gas turbine, in particular an aircraft engine gas turbine. In an enhancement, the turbomachine blades or vanes can be fastened in place, and, in particular, are fastened in place, in particular in a destruction-free detachable manner, in particular in a friction-fitting and/or form-fitting manner, or else in a non-destruction-free detachable manner, in particular in a material-bonded or cohesive manner, to a housing or rotor of the turbomachine (stage), and in an enhancement, by blade or vane roots, which are arranged in a groove of the housing or rotor or are designed for this purpose. In one embodiment, the turbomachine blades or vanes undergo primary forming and are, in particular, cast-molded.

In accordance with one embodiment of the present invention, the turbomachine blade or vane arrangement has at least one tuning element guide housing having one or a plurality of cavities, at least one tuning or impulse element with play of movement for impact contact with the tuning element guide housing being arranged in the cavity or in one cavity or in each of a plurality of cavities.

An impact contact is understood herein, in particular in conventional technical terms, to mean a brief or impulse-like contact, in particular an at least substantially fully elastic and/or stochastic or random contact.

It is possible in this way to implement a novel concept of the applicant for reducing undesired vibrations, wherein said concept is based essentially not on frictional dissipation, but rather on a detuning of natural modes and characteristic frequencies by impacts of the tuning elements. For further details of this concept for detuning, reference is made, in addition, to commonly owned WO 2012/095067 A1 and the content thereof is explicitly incorporated into the present disclosure.

According to one embodiment of the present invention, the tuning element guide housing is arranged and, in particular, accommodated in part or in full in a recess or depression, in particular at the front end and in particular in a front-end frame, of the first turbomachine blade or vane and, in an enhancement, with or without play of movement, in particular translational play of movement, in one or a plurality of directions, in particular with or without translational play of movement, in particular translational play of movement, in the axial direction, with or without play of movement, in particular translational play of movement, in the radial direction, with or without play of movement, in particular translational play of movement, in the peripheral direction, with or without play of movement, in particular translational play of movement, in a direction of insertion or direction of opening into the recess or in the recess, respectively, and/or with or without play of movement, in particular translational play of movement, perpendicular to the direction of insertion. In an enhancement, the recess, in particular the frame, has at least one, particularly axial slot.

It is possible in this way, in one embodiment, to realize an advantageous operating behavior of the tuning element guide housing, in particular an advantageous detuning of natural modes and characteristic frequencies.

In accordance with one embodiment of the present invention, the second turbomachine blade or vane has at least one rib, referred to hereinafter, without limitation of generality, as the first rib, which secures the tuning element guide housing arranged in the recess, in particular in a form-fitting and/or friction-fitting manner and, in particular, fixes it in place with or without play of movement and, in particular, prevents it from being removed and, in particular, from being pulled out of the recess opposite to the direction of insertion or direction of opening into the recess or in the recess, respectively, in particular in a form-fitting and/or friction-fitting manner, and, in an enhancement, limits any twisting or rotation of the tuning element guide housing in the recess and/or out of the recess, or is set up or used for this purpose, and, in particular, is opposite-lying or adjacent in the peripheral direction to the recess or the tuning element guide housing arranged therein, and/or overlaps it at least partially.

In this way, in one embodiment, the tuning element guide housing can be secured advantageously in the recess, in particular without the additional locking plate used in the European Patent application 15190023.0 mentioned initially. Additionally or alternatively, in one embodiment, the recess can be contoured and/or produced advantageously in this way and, in an enhancement, in a demolding-compatible manner, in particular without undercuts. In particular, in one embodiment, it is possible in this way to reduce the cost of production, assembly, and/or disassembly and/or to improve a transmission of vibrations between the tuning element guide housing and the first and second turbomachine blade or vane and thereby realize an advantageous operating behavior of the tuning element guide housing and, in particular, an advantageous detuning of natural modes and characteristic frequencies.

In one embodiment, the second turbomachine blade or vane has at least one (additional) rib, referred to hereinafter, without limitation of generality, as the second rib, which secures the tuning element guide housing arranged in the recess, in particular in a form-fitting and/or friction-fitting manner and, in particular, fixes it in place with or without play of movement and, in particular, prevents it from being removed and, in particular, from being pulled out of the recess opposite to the direction of insertion or direction of opening into the recess or in the recess, respectively, in particular in a form-fitting and/or friction-fitting manner, and, in an enhancement, limits any twisting or rotation of the tuning element guide housing in the recess and/or out of the recess, in particular in interaction with the first ribs, or is set up or used for this purpose, and, in particular is opposite-lying or adjacent in the peripheral direction to the recess or the tuning element guide housing arranged therein and/or overlaps it at least partially.

In this way, in one embodiment, the tuning element guide housing can be secured even better, in particular more robustly, in the recess, in particular at different regions.

In one embodiment, the second rib is inclined or angled toward the first rib, wherein, in an enhancement, an angle between the first and second ribs is at least 45°, in particular at least 60°, in particular at least 80°, and/or at most 135°, in particular at most 120°, in particular at most 100°. In one embodiment, an angle between two (in particular maximum or main) directions of extension of the ribs or tangents thereto, in particular averaged tangents, defines the angle between the ribs.

In this way, it is possible in one embodiment to secure the tuning element guide housing in the recess even better and to secure it, in particular, against twistings in different directions.

In one embodiment, an angle between the first rib and a or the radial or axial direction is at most 30°, in particular at most 15°. In other words, in one embodiment, the first rib extends, at least in portions thereof, at least essentially in the radial or axial direction and, in an enhancement, the second rib extends conversely, at least in portions thereof, at least essentially in the axial or radial direction.

In this way, it is possible in one embodiment to secure the tuning element guide housing in a recess even better and to secure it, in particular, against twistings in different directions.

In one embodiment, the first rib is at least essentially straight. Additionally or alternatively, in one embodiment, the second rib is at least essentially straight. Additionally or alternatively, in one embodiment, the first and second ribs are joined to each other or spaced apart from each other.

In one embodiment, it is possible by way of ribs that are straight and/or spaced apart to save weight and/or to realize an advantageous supporting of the tuning element guide housing.

In one embodiment, the first rib is joined to a front flange of the second turbomachine blade or vane and, in particular, is formed integrally with it. Additionally or alternatively, in one embodiment, the second rib is joined to a front flange or the front flange of the second turbomachine blade or vane and, in particular, is formed integrally with it.

In one embodiment, it is possible in this way to save weight and/or production costs, and/or to realize an advantageous supporting of the rib(s).

In one embodiment, the recess is arranged in a platform on the side of the blade or vane root and/or on a (fluid-mechanical) pressure side and/or on a (fluid-mechanical) outlet or outflow side of the first turbomachine blade or vane.

In one embodiment, it is possible in this way to realize an advantageous operating behavior of the tuning element guide housing and, in particular, an advantageous detuning of natural modes and characteristic frequencies.

In one embodiment, the tuning element guide housing has two or more parts, which are joined to one another, in particular in an airtight and/or cohesive manner, and, in particular, are soldered or welded and which define the cavity or cavities.

As a result of a multipart tuning element guide housing, it is possible in one embodiment to improve the positioning of tuning elements and/or the impact behavior thereof by way of airtight and/or cohesive, closed cavities, in particular an impact behavior of tuning elements arranged therein. In particular, in one embodiment, it is possible in this way to protect them at least in part against surrounding conditions, in particular against operating fluids, of the turbomachine (blade or vane arrangement).

In one embodiment, the tuning element or one tuning element or each of a plurality of tuning elements is spherical in shape and/or produced from metal, $Al_2O_3$, and/or $CrO_2$.

It is possible in this way to realize an advantageous impact contact.

In one embodiment, exactly one tuning element is arranged in the or in one cavity or in each of a plurality of cavities of the tuning element guide housing.

It is possible in this way to realize advantageous individual impact contacts.

Theoretically, it is also conceivable in one embodiment, additionally or alternatively, to arrange two or more tuning elements in the or in one cavity or in each of a plurality of cavities.

It is possible in this way also to realize impact contacts between tuning elements.

In one embodiment, the tuning element or one tuning element or each of a plurality of tuning elements is arranged in a disengaged or freely moving manner in a cavity, which, in an enhancement, can be filled with air.

It is possible in this way to realize an advantageous impact contact.

In one embodiment, the tuning element or one tuning element or each of a plurality of tuning elements has a weight that is at least 0.01 gram (g), in particular at least 0.02 g, and/or at most 0.05 g, in particular at most 0.03 g.

Additionally or alternatively, in one embodiment, the tuning element or one tuning element or each of a plurality of tuning elements has a diameter, in particular a minimum or maximum diameter, that is at least 1 mm and/or at most 5 mm, in particular at 20° C.

Additionally or alternatively, in one embodiment, the play in movement of the tuning element or one tuning element or each of a plurality of tuning elements is at least 0.01 mm, in particular at least 0.1 mm, and/or at least 1% of a minimum diameter of this tuning element and/or at most 10 mm, in particular at most 1 mm, and/or at most 100% of a maximum diameter of this tuning element, in particular at 20° C.

Surprisingly, it has been found that, by way of these parameters or limit values, each already individually, but particularly in combination of two or more of these parameters or limit values, it is possible to bring about an especially advantageous detuning of natural modes and characteristic frequencies.

BRIEF DESCRIPTION OF THE DRAWING FIGURES

Other advantageous enhancements of the present invention ensue from the dependent claims and the following description of preferred embodiments. For this purpose and partially schematic:

DESCRIPTION OF THE INVENTION

Figure 1:
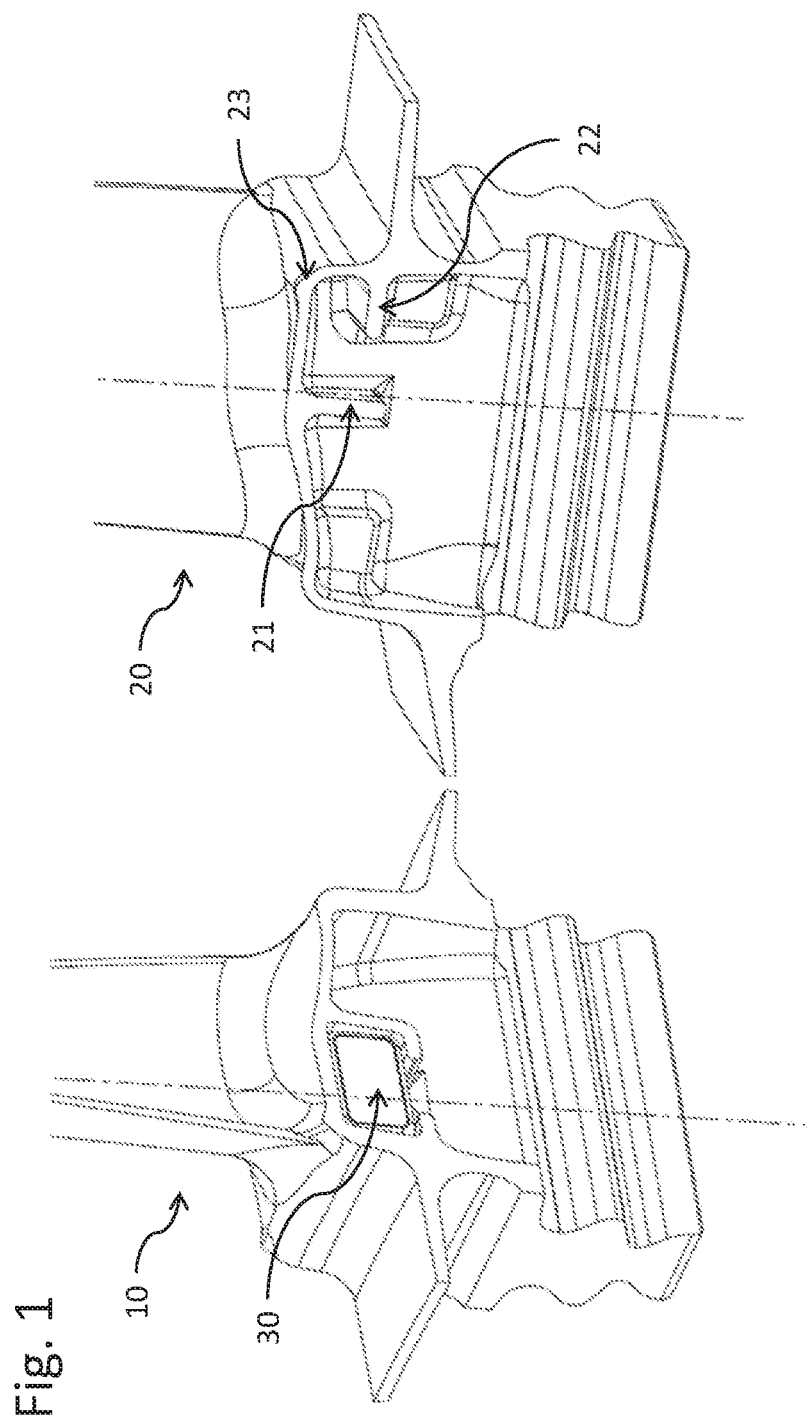
FIG. 1 shows a turbomachine blade or vane arrangement of a turbomachine stage of a turbomachine in accordance with an embodiment of the present invention in perspective exploded view.

FIG. 1 shows a turbomachine blade or vane arrangement of a turbomachine stage of a turbomachine in accordance with an embodiment of the present invention in perspective view.

The turbomachine blade or vane arrangement has a first turbomachine blade or vane 10 and a second turbomachine blade or vane 20, which is adjacent to it (in mounted position) in the peripheral direction, wherein the two turbomachine blade or vanes in FIG. 1 are exploded in the illustration in order to show their adjacent front sides (in mounted position).

Figure 3:
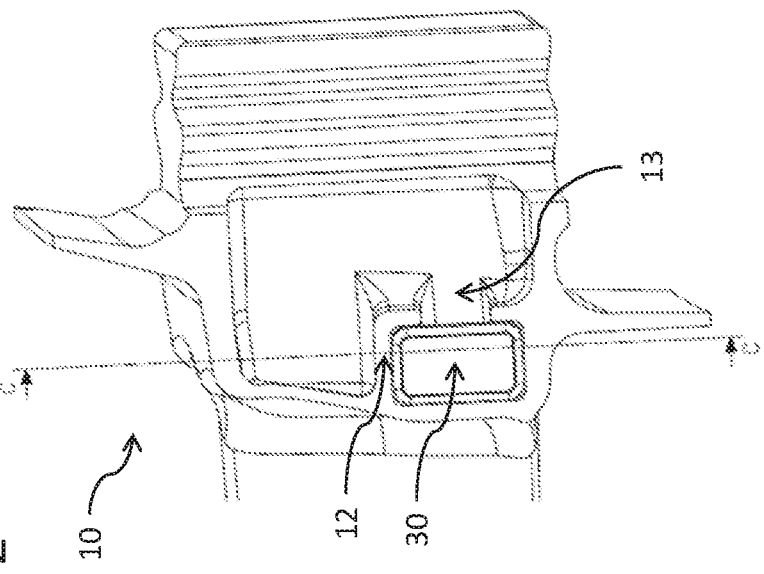
FIG. 3 shows a section through the turbomachine blade or vane arrangement along the line C-C in FIG. 2.
Figure 4:
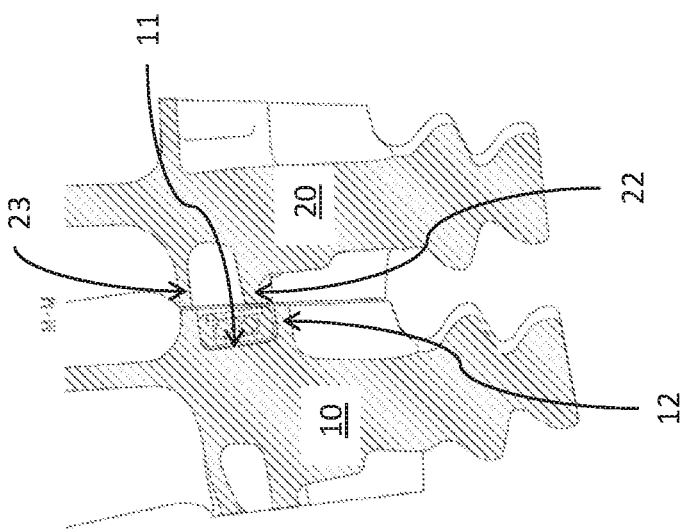
FIG. 4 shows a section through the turbomachine blade or vane arrangement along the line L-L in FIGS. 3.
Figure 5:
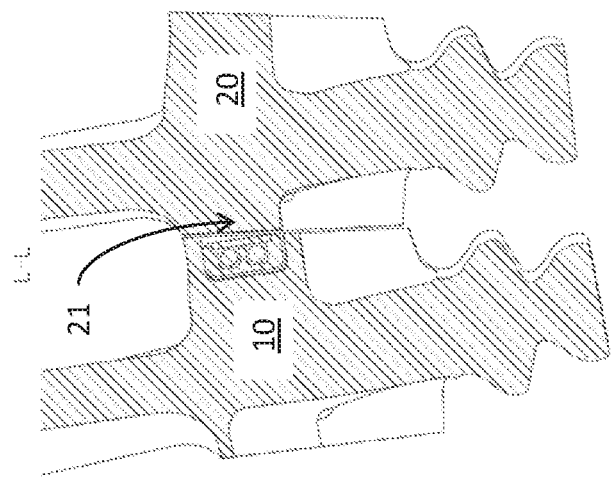
FIG. 5 shows a section through the turbomachine blade or vane arrangement along the line M-M in FIG. 3.

The turbomachine blade or vane arrangement has a tuning element guide housing 30 with a plurality of cavities (eight in the exemplary embodiment), in each of which a conical tuning or impulse element 5 is arranged with play of movement for impact contact with the tuning element guide housing (see FIGS. 3-5).

The tuning element guide housing 30 is fully accommodated in a front-side recess 11 (see FIG. 5) in a frame 12 (see FIG. 2) of the first turbomachine blade or vane 10.

The tuning element guide housing 30 accommodated in the recess 11 in the frame 12 is accommodated therein with translational play of movement in a direction of insertion or direction of opening into or in, respectively, the recess 11 (perpendicular to the plane of the drawing of FIG. 2), so that it can be pulled out of it without the second blade or vane 20.

Figure 2:
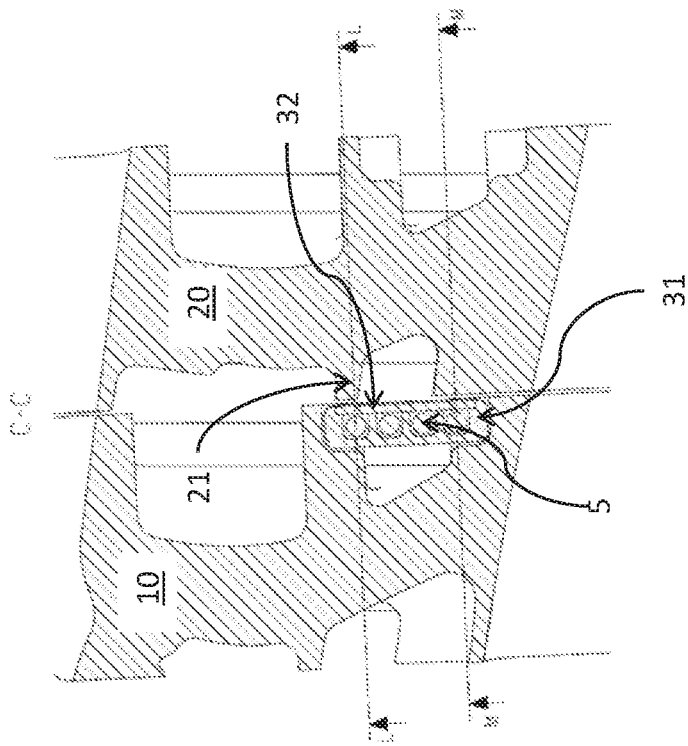
FIG. 2 shows a plan view onto a first turbomachine blade or vane of the turbomachine blade or vane arrangement in the peripheral direction.

The recess 11 or the frame 12 has a slot 13 (see FIG. 2).

The second turbomachine blade or vane 20 has a first rib 21 and a second rib 22, which secure the tuning element guide housing 30 arranged in the recess 11 in a form-fitting manner, and, in particular prevent it, in a form-fitting manner, from being pulled out of the recess opposite to the direction of insertion, and, for this purpose, each lies opposite the recess 11 or the tuning element guide housing 30 arranged therein in the peripheral direction and partially overlap it.

The two ribs 21, 22 prevent, in a form-fitting manner, any twisting or rotation of the tuning element guide housing out of the recess 11.

An angle between the second rib 22, which is inclined toward the first rib, and the first rib is about 90°.

The first rib 21 extends essentially in the radial direction and the second rib 22 extends correspondingly essentially in the axial direction.

In this way, the first rib 21 limits, in particular, any twisting of the tuning element guide housing 30 in the plane of the drawing of FIG. 4 and the first and second ribs 21, 22 prevent, in particular, any twisting of the tuning element guide housing 30 in the plane of the drawing of FIG. 3.

The first and second ribs are essentially straight, spaced apart from each other, and formed integrally with a front flange 23 of the second turbomachine blade or vane.

The recess 11 is arranged in a platform on the side of the blade or vane root on a pressure side and on an outlet or outflow side of the first turbomachine blade or vane 10.

The tuning element guide housing 30 has two parts 31, 32, which are joined to each other in an airtight and cohesive manner and which define the cavities.

Although, in the above description, exemplary embodiments were explained, it is noted that a large number of modifications are possible. Moreover, it is noted that the exemplary embodiments are merely examples, which are not intended to limit the protective scope, the applications, and the design in any way. Instead, the preceding description affords the person skilled in the art a guideline for the implementation of at least one exemplary embodiment, with it being possible to make diverse changes, in particular in regard to the function and arrangement of the described components, without departing from the protective scope that ensues from the claims and combinations of features equivalent to these.

The invention claimed is:

1. A turbomachine blade or vane arrangement having a first turbomachine blade or vane, a second turbomachine blade or vane adjacent to it, and a tuning element guide housing with at least one cavity, in which at least one tuning element is arranged with play of movement for impact contact with the tuning element guide housing, with the tuning element guide housing being arranged at least in part in a recess in a frame of the first turbomachine blade or vane,
wherein the second turbomachine blade or vane has at least one first rib for securing the tuning element guide housing arranged in the recess.

2. The turbomachine blade or vane arrangement according to claim 1, wherein the second turbomachine blade or vane has at least one second rib for securing the tuning element guide housing arranged in the recess.

3. The turbomachine blade or vane arrangement according to claim 2, wherein the at least one second rib is inclined toward the at least one first rib, wherein an angle between the at least one first and the at least one second rib, in particular, is at least 45° and at most 135°.

4. The turbomachine blade or vane arrangement according to claim 1, wherein an angle between the at least one first rib and a radial or axial direction is at most 30°.

5. The turbomachine blade or vane arrangement according to claim 1, wherein the first and/or second rib is joined to a front flange of the second turbomachine blade or vane and are integrally formed.

6. The turbomachine blade or vane arrangement according to claim 1, wherein the recess is arranged in a platform on the side of the blade or vane root or on a pressure or outlet side of the first turbomachine blade or vane.

7. The turbomachine blade or vane arrangement according to claim 6, wherein the tuning element guide housing has at least two parts, which are joined to each other in an airtight or cohesive manner and define the cavity.

8. The turbomachine blade or vane arrangement according to claim 1, wherein the at least one tuning element is conical in form.

9. The turbomachine blade or vane arrangement according to claim 1, wherein one tuning element or at least two tuning elements are arranged in the cavity of the tuning element guide housing.

10. The turbomachine blade or vane arrangement according to claim 1, wherein at least one tuning element is arranged in a cavity in a disengaged manner.

11. The turbomachine blade or vane arrangement according to claim 1, wherein at least one tuning element has a weight that is at least 0.01 g and at most 0.05 g.

12. The turbomachine blade or vane arrangement according to claim 1, wherein the at least one tuning element has a diameter of at least 1 mm and at most 5 mm.

13. The turbomachine blade or vane arrangement according to claim 1, wherein the play of movement of the at least one tuning element is at least 0.01 mm and at most 10 mm.

14. The turbomachine blade or vane arrangement according to claim 1, wherein the turbomachine blade or vane arrangement is arranged in a compressor or turbine stage.

15. The turbomachine blade or vane arrangement of claim 14, wherein the compressor or turbine stage is configured for use in an aircraft engine gas turbine.

16. The turbomachine blade or vane arrangement according to claim 1, wherein the play of movement of the at least one tuning element is at least 1% of a minimum diameter of the tuning element and at most 100% of a maximum diameter of the tuning element.

* * * * *